US005198955A

United States Patent [19]

Willner

[11] Patent Number: 5,198,955

[45] Date of Patent: Mar. 30, 1993

[54] SEALED PLUG-IN GFCI

[75] Inventor: Jonathan Willner, Toronto, Canada

[73] Assignee: Nuheat Inc., Toronto, Canada

[21] Appl. No.: 560,701

[22] Filed: Jul. 31, 1990

[51] Int. Cl.$^5$ .............................................. H02H 3/16

[52] U.S. Cl. ......................................... 361/42; 361/45

[58] Field of Search .................. 361/399, 42, 45, 399, 361/398; 307/118

[56] References Cited

U.S. PATENT DOCUMENTS 4,567,544 1/1986 Ronbmus et al. .................. 361/399

4,967,308 10/1990 Morse .................................. 361/42

*Primary Examiner*—A. D. Pellinen

*Assistant Examiner*—S. Jackson

*Attorney, Agent, or Firm*—Neil H. Hughes; Ivor M. Hughes

[57] ABSTRACT

A miniature circuit interrupter for interruption of a primary circuit, the circuit interrupter formed or molded with a plug, connector or the like, the plug or connector being non-serviceable and the circuit interrupter therein being sealed and watertight.

14 Claims, 3 Drawing Sheets

INTERRUPTER BLOCK DIAGRAM

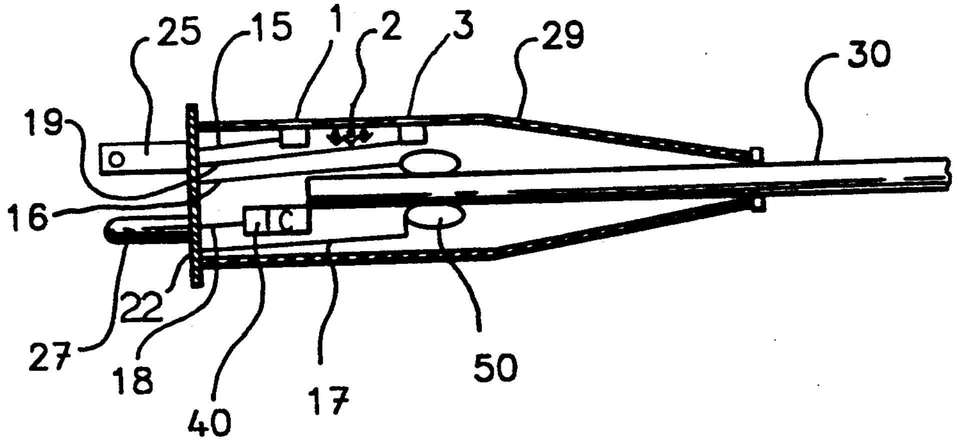
FIG.5.
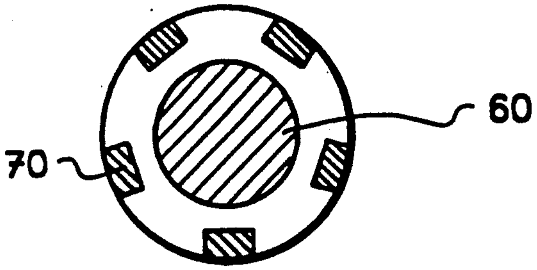
FIG. 6.
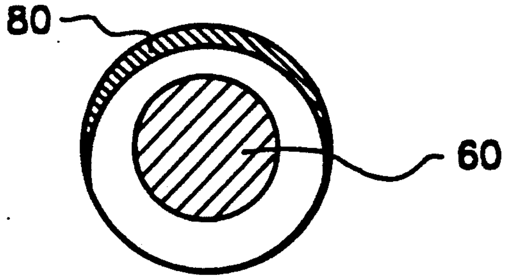
FIG. 6A.
FIG.6.

SEALED PLUG-IN GFCI

FIELD OF THE INVENTION

This invention relates to electrical fault detection in the primary circuit for an appliance of the like and specifically to a ground fault circuit interrupter formed integrally with a molded plug.

BACKGROUND OF THE INVENTION

Ground fault circuit interrupters are known in the art. Examples are U.S. Pat. Nos. 3,047,775 and 3,213,321. These interrupters are large and costly to manufacture. Many of the prior art units are assembled from components and are easily disassembled or tampered with by the end user of the appliance. The prior art units which are assembled are not waterproof.

Some of the prior art structures are embodied in a plug or connector. These units are assembled. Examples of such units are found in the prior art listed below.

U.S. Pat. No. 4,567,544 to Pass and Seymour
U.S. Pat. No. 3,761,774 to Black and Decker
U.S. Pat. No. 4,687,906 to Matsushita
U.S. Pat. No. 4,550,358 to Sunbeam
U.S. Pat. No. 4,086,643 to JDS Products Inc.
U.S. Pat. No. 4,464,582 to Aragaki et al
U.S. Pat. No. 4,285,022 to Lewiner et al
U.S. Pat. No. 4,378,579 to Sprague
U.S. Pat. No. 4,345,223 to Chien-Chun
U.S. Pat. No. 4,712,154 to Philips Nowhere in the prior art is there found a miniature interrupter or the like which is formed or moulded with a plug or separate module connected to the power cord which provides a watertight package, which is economical to manufacture, and which is not serviceable by the end user.

There is therefore a need for a cost effective miniature fault interrupter for an appliance which is formed or molded with a plug connector or the like and is not subject to tampering. This need is not satisfied by those structures known in the art.

It is therefore a primary object of this invention to provide an interrupter for a primary circuit which is economical to manufacture with the appliance or the like being protected.

It is a further object of this invention to provide an interrupter formed or molded with the connector or plug of the power cord which is sealed, watertight and not serviceable by the appliance user.

Further and other objects of this invention will become apparent to a man skilled in the art when considering the following summary of the invention and the more detailed description of the preferred embodiments illustrated herein.

SUMMARY OF THE INVENTION

According to one aspect of the invention there is provided a miniature circuit interrupter for interruption of a primary circuit, the circuit interrupter formed or molded with a plug, connector or the like, the plug or connector being non-serviceable and the circuit interrupter therein being sealed and watertight.

According to another aspect of the invention there is provided an assembly comprising a power supply cord and a miniature circuit interrupter and the components therefore assembled with the power cord, the miniature circuit interrupter and the components therefore being mounted, fastened or the like to, a base of a plug or connector, mounting board, or the like, prior to the molding or forming of a plug, connector or the like, the interrupter components being protected in a shroud sufficiently shielding the components during the molding or forming process to prevent damaging the miniature circuit interrupter and the components therefore during the molding or forming process.

According to another aspect of the invention there is provided a plug, connector or the like for an appliance comprising a miniature circuit interrupter for interruption of a primary circuit of the appliance, the circuit interrupter formed or molded with the plug, connector or the like, the plug or connector being non-serviceable and the circuit interrupter therein being sealed and watertight, the primary circuit including at least two powered lines and a ground line to ground the appliance when connected to a power source. In a preferred embodiment the circuit interrupter is a ground fault circuit interrupter preferably which may further comprise means to detect a fault to ground, an integrated circuit (preferably a micro chip manufactured by Raython Model or the like and substantially equivalent in performance to a GFCI chip manufactured by National, Model Number LM1851, either dual inline or surface mounted, or the like) to detect the fault condition, for example line to line for the powered lines and or line to ground, and means to disconnect the primary circuit from the power source, preferably failing in the open circuit position, any fault being communicated to the integrated circuit by the means to detect the fault condition, the integrated circuit sensing the fault condition and at a predetermined limit triggering the means to disconnect the primary circuit. In one embodiment the predetermined limit is less than 50 milliamperes for a duration of less than 3 milliseconds. In another embodiment the integrated circuit may further comprise means to amplify the sensed fault condition to trigger the means to disconnect the primary circuit.

In a preferred embodiment the circuit interrupter further comprises an electromagnet switch which includes more than two contact surfaces in order to, dissipate the heat generated, and or reduce the magnitude of a spark or arc which may occur, during normal use of the appliance or when a fault condition occurs. The objective therefore is to provide a significantly greater surface area as a contact surface as a series of discontinuous contact sets. Alternatively a larger area for contact may be provided such as a crescent shaped contact about the electromagnet switch of sufficient surface area to allow the dissipation of heat generated during normal use or at a fault condition.

BRIEF DESCRIPTION OF THE DRAWINGS

FIG. 5 is a cross-sectional plan view the structure of FIG. 1 prior to moulding the case 20 therewith illustrated in a preferred embodiment of the invention.

FIG. 6 is a schematic view of the contacts for the switches for the electromagnetic switch embodied in the preferred embodiment of the invention.

DETAILED DESCRIPTION OF PREFERRED EMBODIMENTS OF THE INVENTION

Figure 1:
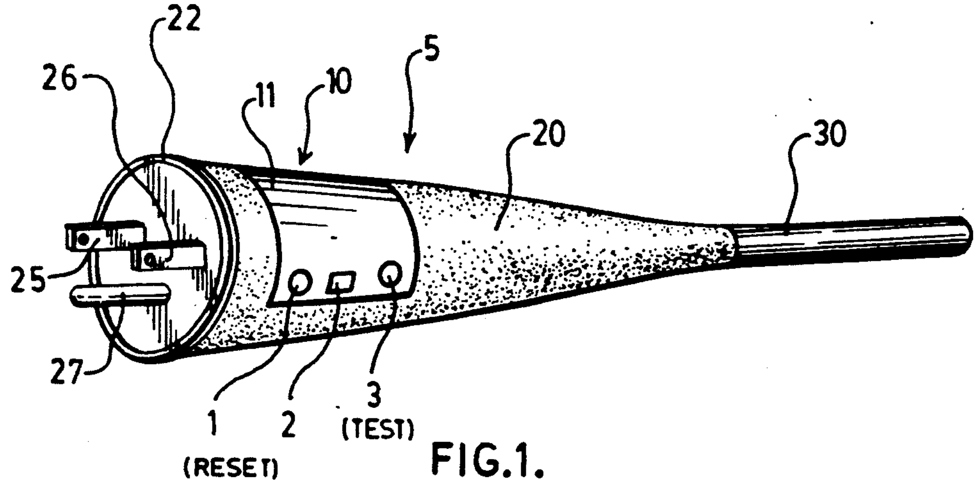
FIG. 1 is a perspective view of a ground fault circuit interrupter moulded in a plug disposed at one end of a power cord and illustrated in a preferred embodiment of the invention.
Figure 2:
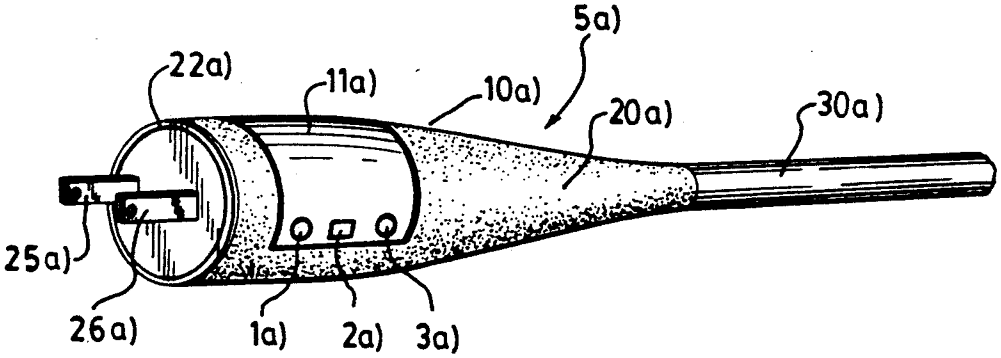
FIG. 2 is identical to FIG. 1, with the exception that the plug of FIG. 2 does not include a grounding pin 27 illustrated in an alternative embodiment of the invention.
Figure 3:
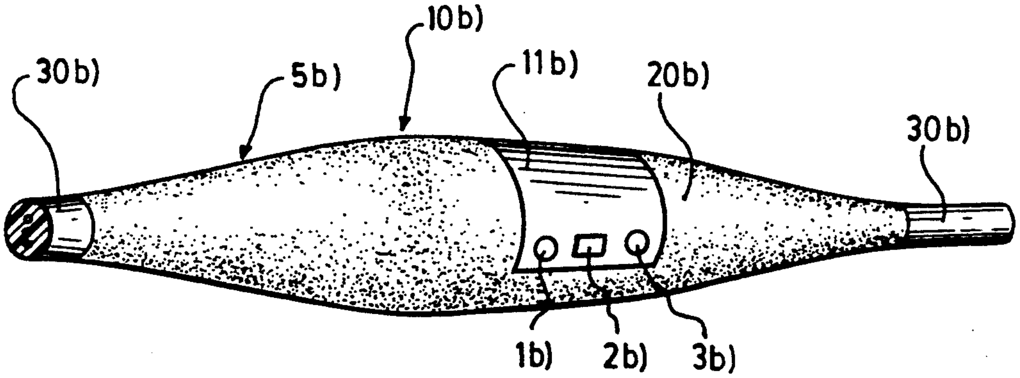
FIG. 3 is a perspective view of a ground fault circuit interrupter embodied in a continuous power cord as a module located between the ends of the power cord illustrated in an alternative embodiment of the invention.

Referring now to FIGS. 1, 2 and 3, there is illustrated a miniature ground fault circuit interrupter embodied in a plug or power cord used with an appliance. For example, any appliance would benefit from the inclusion of a ground fault circuit interrupter therein. The purpose of a ground fault circuit interrupter is well known in the art. The instant invention embodies a miniaturized ground fault circuit interrupter which includes the advantages of using a ground fault circuit interrupter hereinafter referred to as a GFCI moulded with a plug or connector at the end of a power cord 30 or in between the portions of the power cord as best illustrated in FIG. 3. Therefore, whether the GFCI is embodied in the plug of FIG. 1 which includes a grounding pin in the plug of FIG. 2 which does not include a grounding pin or the module of FIG. 3, wherein any convenient plug may be used at the end of the cord. Of course, any appliance may be connected to the cord at the end remote the plug. By having the miniaturized GFCI embodied with the plug in the preferred embodiment and moulded into the plug, the plug is not serviceable. That is to say that the plug cannot be disassembled and tampered with or serviced. By moulding the components into the plug of FIG. 1, the plug of FIG. 2 or the module of FIG. 3, the use of the miniaturized GFCI is transparent to the end user and the benefits of the GFCI are available at all times.

Figure 4:
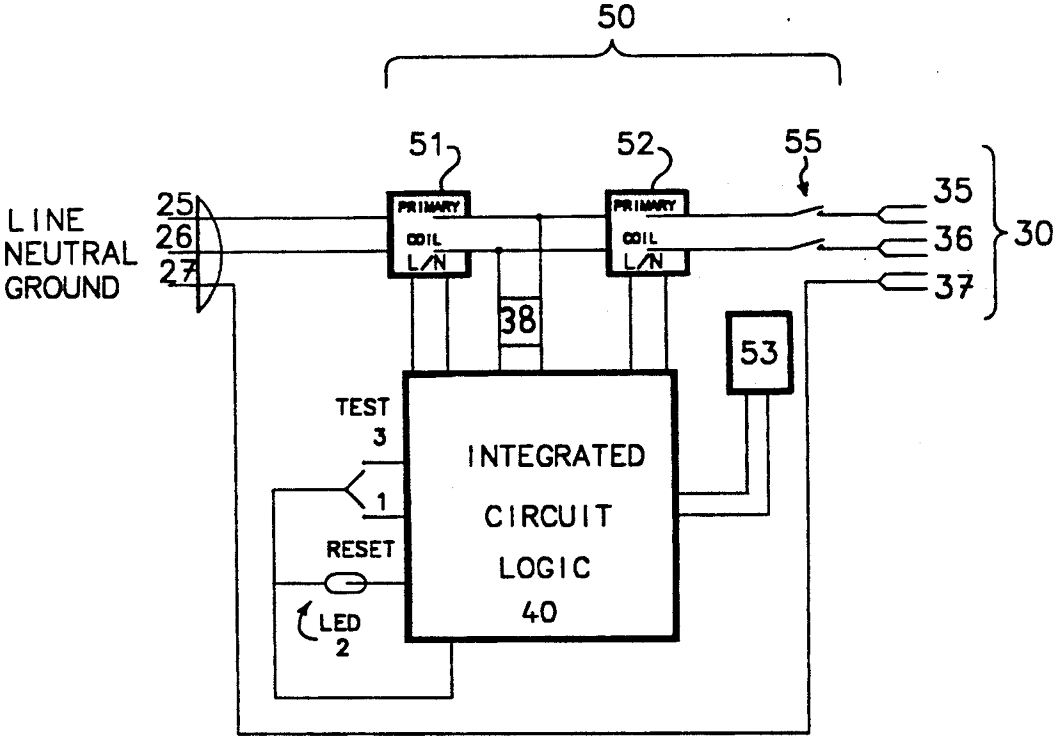
FIG. 4 is a block diagram of the ground fault circuit interrupter of FIG. 1 illustrated in a preferred embodiment of the invention.

For example, if the plug of FIG. 1 were used with a radio, tape recorder or the like, the unit could be moved from room to room while still maintaining the benefits of a GFCI in the circuit. Many of the prior art structures embodied the GFCI in the power source. Also, by providing an integrated circuit as best illustrated in FIG. 4, the entire system may be miniaturized to fit in a plug which is of standard format. It is not necessary that the plug be of standard format, but it is one embodiment of the invention. By having the miniaturized GFCI moulded or formed with the plug, the plug is also sealed and water tight.

Referring now to FIG. 1, there is provided a plug 5, which includes a miniaturized GFCI 10 retained in the plug housing 20. The power cord 30 extends into the housing 20 and is connected to the components of the GFCI 10 as best seen in FIG. 4. The power supply 30 includes a line 35, a neutral 36 and a ground 37 correlating with the pins 25, 26 and 27 respectively. A light emitting diode 2 is provided which lights, in for example, ruby red, to indicate a ground fault condition. A test button 3 is provided which may also light via the use of a light emitting diode included with a clear plastic button in order to verify the circuitry. A reset button 1, which also may light individually as described in relation to the test button is provided to reset a fault condition once it occurs, and the fault condition is corrected. A base 22 is provided with the plug which has extending therefrom the line pin 25, the neutral pin 26 and the ground pin 27.

Referring now to FIG. 2, there is illustrated in an alternative embodiment of the invention a plug 5*a* including a miniaturized GFCI 10*a* in a housing 20*a* connected to a power code 30*a*. The GFCI includes reset and test buttons 1*a* and 3*a* along with indicator LED 2*a*. A base 22*a* is provided to which the pins 25*a* and 26*a* are connected through.

Referring now to FIG. 3, a miniaturized GFCI 10*b* is embodied in a module 5*b* which is housed in a housing 20*b* connected to a cord 30*b* running continuously through the module 5*b*. A reset and test button 1*b* and 3*b* is provided along with the light emitting diode 2*b*.

Referring to FIGS. 1, 2 and 3, there is provided a slideable cover 11 which acts as protective cover for the test and reset buttons so that they are not inadvertently pushed until necessary by the end user The cover therefore 11, 11*a* and 11*b* is retractable and disposed within a groove formed on the housing 20. It is not necessary that the cover be provided and the cover is supplementary. The reset and test buttons may be recessed so that they are accessed only by a sharp object such as a pin to operated.

Referring now to FIG. 4, there is illustrated the block diagram for the GFCI embodied in the plug of FIG. 1. Therefore the power line 30 includes a line 35, a neutral 36 and a ground 37 correlating with the pins 25, 26 and 27. Test and reset switches 3, and 1 respectively are provided in an embodiment which allows one switch to operate both functions. The LED provided 2 is included to indicate the fault condition. The Integrated Circuit Logic 40 is embodied on a chip manufactured by National has an integrated circuit number LM1851 which includes an amplifying function to amplify the fault condition so that a correct response may be triggered and the switch 55 may be open. Also included in the circuit is a stepped down transformer or the like to step down the voltage which is normally 110 to a level which is acceptable by the chip described above. Therefore the stepped down transformer or the like 38 is provided. Of course, this function may be included as required in the circuitry and if possible with the chip. A primary coil 51 is installed across the line and neutral 35 and 36 respectively in order to determine a line and neutral fault and the coil 52 is provided similarly in order to detect a line to line fault. As is known, when a net flux is achieved, the integrated circuit logic will sense the fault condition by the generation of a current by the secondary coil 53. The integrated circuit logic 40 includes the amplifying circuit described in the LM1851 amplifying chip specification sheet manufactured by National which thereafter triggers the opening of the switches 55 until such time as the fault is corrected.

In order to dissipate any of the heat generated within the plug by arcing sparking, or by normal use, it is highly recommended that the surface area of the contacts at the switches be increased to a multiplicity of contacts. For example, the electrical contacts are normally in pairs and 1, 2, 3, 4, 5, 6, 7, 8 pairs of contacts may be used in order to distribute the heat and probability of a spark or arc through a greater surface area through a number of discontinuous surfaces. In doing so the risk of creating a heat pocket is greatly reduced. Further, any heat that generated may be easily dissipated which may occur during a fault condition or the normal use of the appliance. Alteratively, a large contact area may be provided such as a crescent shaped contact for the electromagnetic switch of sufficient area to allow the dissipation of heat generated during normal use or at a fault condition. This in not illustrated in FIG. 4. It is best observed in relating to FIG. 6.

The circuitry of FIG. 4 including the micro chip and the small components thereof is miniature and such exaggerated in size by the schematic block diagram of FIG. 4. The intention is provide all of the features described in miniature size to enable the GFCI to be miniaturized with all of the functions thereof and to be moulded with a preferably standard size plug for an appliance or the like. Of course, it is not necessary that the plug be standard sized but that the components be moulded within the plug to be sealed and non-serviceable as well as water-type.

In order to accomplish this purpose, it is recommended that the power cord 30 which includes the line 35, neutral 36 and the ground 37 being connected to the pins 25, 26 and 27 respectively include a separate base member 22. As illustrated in FIG. 5, the separate base member 22 has fastened thereto the plugs 25, 26 (not shown) and 27 which are connected to the power cord 30 via lines 35, neutral 36 and ground 37 respectively. The integrated circuit or chip 40 is also connected to the base via a connector 18 to physically hold the chip in place. Similarly, the coil 50 which may be a concentric primary and secondary set of coils which detects across the line in a neutral 35 and 36 is supported by a connector 16 supported to the base 16. Further, the test and reset buttons or switches 1 and 3 are supported via a support portion 19 and 15 respectively. The LED 2 may be supported from the support 16 as well. A support 17 further assists in the support of the coil. The entire GFCI including all of the portions described above in the previous paragraph are shrouded in a skin of transparent plastic which acts as a seal to protect all of the components of the miniaturized GFCI during the moulding process. Without the seal the components may be damaged in the moulding process unless the plug is cold moulded or formed. Since it is recommended to mould or form with conventional methods which are more economical than cold forming, the skin or seal is recommended to prevent damage to the components of the miniaturized GFCI. Therefore, the power cord 30 is assembled with all of the components described above supported from the base 22 by the supports 15, 16, 17, 18 and 19 for supporting the chip coil, reset and test switches and the LEDs, the cord is then placed in a mould with the skin or transparent plastic material 29 disposed around the components of the miniaturized GFCI, the plug is then moulded to form the housing 20 of FIG. 1, while the miniaturized GFCI components are protected from the heat of the moulding process. The cord is then removed from the mould and the structure of FIG. 1 is manufactured with the exception of the slideable cover 11 which is an option.

Again, referring to FIG. 1 and FIG. 5 and FIG. 4, the reset function 1, would be pushed by a user when a fault condition is present and the LED is lit. The reset will only reset the circuit if the fault condition has been corrected. Therefore, as the fault condition has caused the circuit to be opened, the circuit remains in an open position until the fault is corrected and the circuit is reset. The resetting of the circuit is allowed through the integrated circuit logic 40 of FIG. 4 when the correct conditions are present. Similarly, when the test button when pushed provides through the logic of the chip 40, the necessary task to ensure that the GFCI is operational. The LED of course, lights when a fault condition is present either line to neutral or line to line. It is also practical to include with the chip some filtering of the fault condition via portions of the micro circuit which behave functionally the same as capacitors in filtering the signal of the secondary coil.

Referring again to FIG. 1, therefore a miniaturized GFCI has been provided in a plug in a preferred embodiment including an acrylic cover 11 covering the test and reset buttons 3 and 1 respectively embodied in the housing 20 of the plug 5. The housing 20 is sealed being formed by the moulding process as described in relation to FIG. 5, the plug therefore of FIG. 1 not being serviceable or subject to tampering by the end user. All of the advantages described in relation to FIGS. 4, 5 and 6 are also available for the structures of FIG. 2 and 3.

As many changes can be made to the preferred embodiments of the invention without departing from the scope thereof; it is intended that all material contained herein be considered illustrative of the invention and not in a limiting sense.

The embodiments of the invention in which an exclusive property or privilege is claimed are as follows:

1. A miniature circuit interrupter for interruption of a primary circuit, the circuit interrupter formed or molded with a plug connector or the like, the plug or connector being non-serviceable and the circuit interrupter therein being sealed and watertight, wherein the interrupter further comprises means to detect a fault to ground, an integrated circuit to detect the fault condition, for example line to line for the powered lines and or line to ground, and means to disconnect the primary circuit from the power source, any fault being communicated to the integrated circuit by the means to detect the fault condition, the integrated circuit sensing the fault condition and at a predetermined limit triggering the means to disconnect the primary circuit, wherein the circuit interrupter further comprises an electromagnetic switch which includes increased contact surfaces in order to, dissipate the heat generated, and or reduce the magnitude of a spark or arc which may occur, during normal use of the appliance or when a fault condition occurs.

2. An assembly comprising a power supply cord and a miniature circuit interrupter and the components therefore assembled with the power cord, the miniature circuit interrupter and the components therefore being mounted, fastened or the like to, a base of a plug or connector, mounting board, or the like, prior to the molding or forming of a plug, connector or the like, the interrupter components being protected in a shroud sufficiently shielding the components during the molding or forming process to prevent damaging the miniature circuit interrupter and the components therefore during the molding or forming process.

3. A plug, connector or the like for an appliance comprising a miniature circuit interrupter for interruption of a primary circuit of the appliance, the circuit interrupter formed or molded with the plug, connector or the like, the plug or connector being non-serviceable and the circuit interrupter therein being sealed and watertight, the primary circuit including at least two powered lines and a ground line to ground the appliance when connected to a power source, wherein the interrupter further comprises means to detect a fault to ground, an integrated circuit to detect the fault condition, for example line to line of the powered lines and or line to ground, and means to disconnect the primary circuit from the power source, any fault being communicated to the integrated circuit by the means to detect the fault condition, the integrated circuit sensing the fault condition and at a predetermined limit triggering the means to disconnect the primary circuit, wherein the circuit interrupter further comprises an electromagnet switch which includes increased contact surface in order to dissipate the heat generated, and or reduce the magnitude of a spark or arc which may occur, during normal use of the appliance or when a fault condition occurs.

4. The plug of claim 1 or 3 wherein the circuit interrupter is a ground fault circuit interrupter.

5. The plug of claim 1 or 3 wherein the integrated circuit is a microchip manufactured by Raython Model or the like and substantially equivalent in performance to a GFCI chip manufactured by National, Model Number LM1851, either dual inline or surface mounted, or the like.

6. The plug of claim 1 or 3 wherein the circuit fails in the open position.

7. The plug of claim 1 or 3 wherein the predetermined limit is less than 50 milliamperes for a duration of less than 3 milliseconds.

8. The plug of claim 1 or 3 wherein the integrated circuit further comprises means to amplify the sensed fault condition to trigger the means to disconnect the primary circuit.

9. The plug of claim 5 wherein the integrated circuit further comprises means to amplify the sensed fault condition to trigger the means to disconnect the primary circuit.

10. The plug of claim 1 or 3 wherein the contact surfaces of the electromagnet switch further comprises more than two contact surfaces.

11. The plug of claim 1 or 3 wherein the contacts further comprise a larger area for contact such as a crescent shaped contact about the electromagnet switch of sufficient surface area to allow the dissipation of heat generated during normal use or at a fault condition.

12. The plug of claim 5 wherein the contacts further comprise a larger area for contact such as a crescent shaped contact about the electromagnet switch of sufficient surface area to allow the dissipation of heat generated during normal use or at a fault condition.

13. The plug of claim 5 wherein the contacts further comprise a larger area for contact such as a crescent shaped contact about the electromagnet switch of sufficient surface area to allow the dissipation of heat generated during normal use or at a fault condition.

14. The plug of claim 9 wherein the contacts further comprise a larger area for contact such as a crescent shaped contact about the electromagnet switch of sufficient surface area to allow the dissipation of heat generated during normal use or at a fault condition.

* * * * *